US012204756B2

(12) United States Patent
Gorrle et al.

(10) Patent No.: US 12,204,756 B2
(45) Date of Patent: Jan. 21, 2025

(54) SSD USE OF HOST MEMORY BUFFER FOR IMPROVED PERFORMANCE

(71) Applicant: Western Digital Technologies, Inc., San Jose, CA (US)

(72) Inventors: Dhanunjaya Rao Gorrle, Milpitas, CA (US); Aajna Karki, San Jose, CA (US); Hongmei Xie, Sunnyvale, CA (US)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 163 days.

(21) Appl. No.: 17/931,447

(22) Filed: Sep. 12, 2022

(65) Prior Publication Data
US 2024/0086071 A1 Mar. 14, 2024

(51) Int. Cl.
*G06F 3/06* (2006.01)
(52) U.S. Cl.
CPC ............ *G06F 3/0611* (2013.01); *G06F 3/061* (2013.01); *G06F 3/0629* (2013.01); *G06F 3/0673* (2013.01)
(58) Field of Classification Search
CPC ...... G06F 3/061; G06F 3/0611; G06F 3/0629; G06F 3/0656; G06F 3/0673
See application file for complete search history.

(56) References Cited

U.S. PATENT DOCUMENTS

| 9,563,382 | B2 | 2/2017 | Hahn et al. |
| 10,069,597 | B2 | 9/2018 | Benisty et al. |
| 10,732,878 | B1 * | 8/2020 | Muthiah ............. G06F 12/0246 |
| 10,824,568 | B2 | 11/2020 | Benisty et al. |
| 11,403,011 | B1 * | 8/2022 | Gunda .................. G06F 3/0679 |
| 2015/0074328 | A1 | 3/2015 | Baryudin et al. |
| 2017/0351452 | A1 * | 12/2017 | Boyd ..................... G06F 3/0611 |
| 2018/0293174 | A1 | 10/2018 | Song et al. |
| 2019/0146712 | A1 | 5/2019 | Lee |
| 2020/0142630 | A1 | 5/2020 | Lee et al. |
| 2021/0334200 | A1 | 10/2021 | Xu |
| 2022/0058134 | A1 | 2/2022 | Minopoli et al. |

FOREIGN PATENT DOCUMENTS

WO        2019083775 A1    5/2019

* cited by examiner

*Primary Examiner* — Aracelis Ruiz
(74) *Attorney, Agent, or Firm* — ARENTFOX SCHIFF LLP

(57) ABSTRACT

Aspects of a storage device are provided that requests L2P address translation data from an HMB for execution of an associated host command using a dynamically determined HMB transfer size. The storage device includes a volatile memory and a controller. The controller allocates, in the volatile memory, multiple memory locations for L2P address translation data from an HMB. The controller receives a command indicating a host data length, and transmits a request for a portion of the L2P address translation data stored in the HMB for the command. The HMB transfer size associated with the request may be based on the host data length of the associated host command, a quantity of free and contiguous memory locations available in the HMB read buffer, or a minimum between a size of the portion and a total size of the free and contiguous memory locations. Thus, HMB transfer latency may be reduced.

18 Claims, 10 Drawing Sheets

SSD USE OF HOST MEMORY BUFFER FOR IMPROVED PERFORMANCE

BACKGROUND

Field

This disclosure is generally related to electronic devices and more particularly to storage devices.

INTRODUCTION

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory.

A host device may include a host memory buffer (HMB). The HMB allows a storage device to utilize host volatile memory (e.g., dynamic random access memory (DRAM)) for the storage device's own purposes. For instance, although accessing data in a HMB (e.g., in a host DRAM) is slower than accessing data in the flash storage device, such data access is still faster than accessing data from NAND memory, and therefore the controller may utilize the HMB to store various control information and user data for host commands.

SUMMARY

One aspect of a storage device is disclosed herein. The storage device includes a volatile memory and a controller. The controller is configured to allocate, in the volatile memory, a plurality of memory locations for logical-to-physical (L2P) address translation data from a host memory buffer (HMB), to receive a command indicating a host data length, and to transmit a request for a portion of the L2P address translation data stored in the HMB, where the portion of the L2P address translation data is for the command. A size of the L2P address translation data associated with the request is based on the host data length indicated in the command.

Another aspect of a storage device is disclosed herein. The storage device includes a volatile memory and a controller. The controller is configured to allocate, in the volatile memory, a plurality of memory locations for storing L2P address translation data from an HMB, and to transmit a request for a portion of the L2P address translation data stored in the HMB, where the portion of the L2P address translation data is for a host command. A size of the L2P address translation data associated with the request is based on a quantity of the memory locations which are free and contiguous at a time of the request.

A further aspect of a storage device is disclosed herein. The storage device includes a volatile memory and a controller. The controller is configured to allocate, in the volatile memory, a plurality of memory locations for storing logical-to-physical (L2P) address translation data from an HMB, to receive a command, and to transmit a request for a portion of the L2P address translation data stored in the HMB, where the portion of the L2P address translation data is for the command. A size of the L2P address translation data associated with the request is based on a minimum of: a size of the portion of the L2P address translation data for the command, and a total size of a quantity of the memory locations which are free and contiguous at a time of the request.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
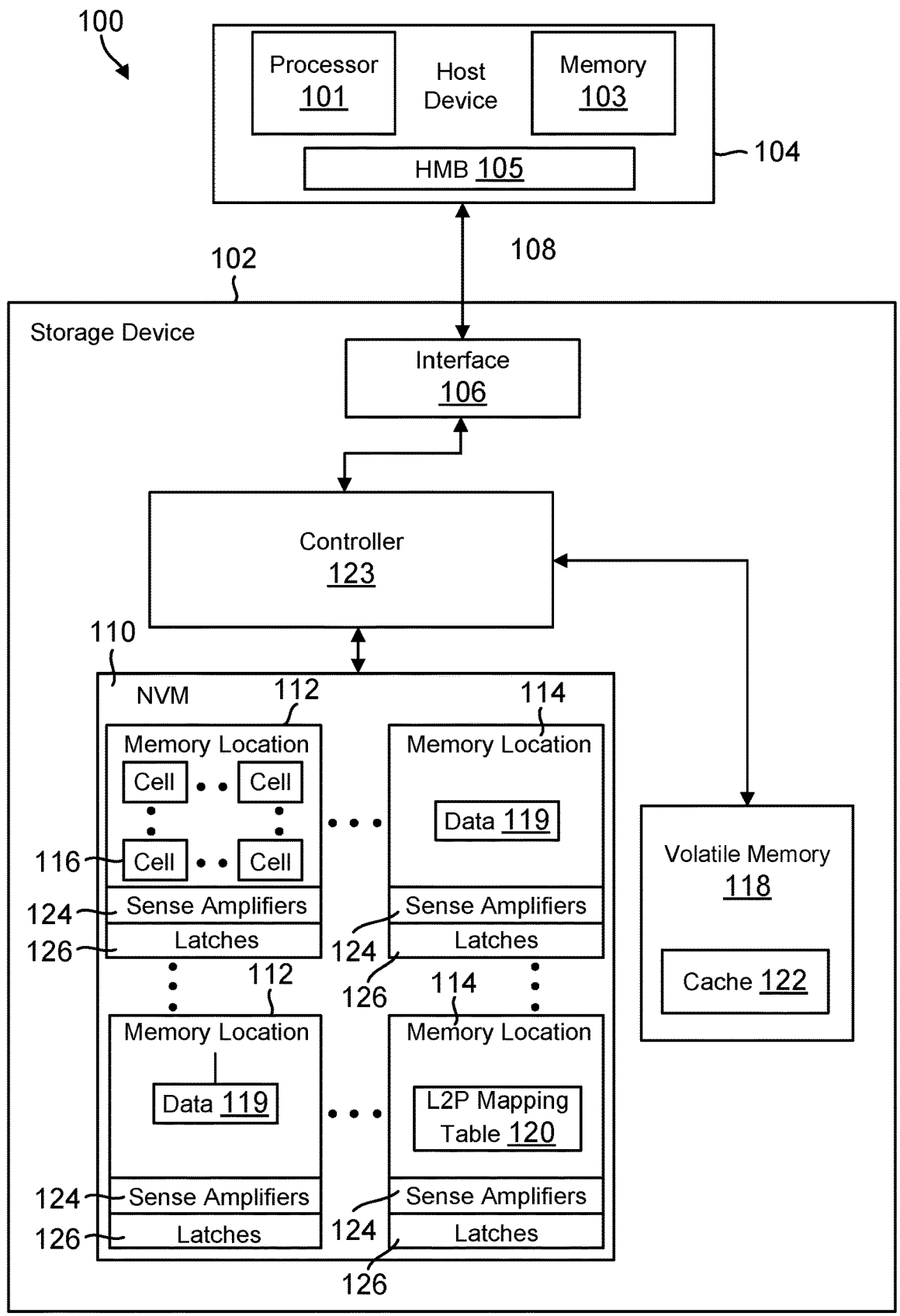
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

A storage device lacking dynamic random access memory (DRAM) (e.g., a DRAM-less device), or including limited DRAM (e.g., a low DRAM device), may utilize a host memory buffer (HMB) to store logical-to-physical (L2P) address translation data. L2P address translation data may include pages of an L2P mapping table which the controller may use to translate logical addresses in host commands to physical addresses in flash memory. Since static RAM (SRAM) is typically limited in size, the HMB provides additional storage capability for the controller to utilize L2P address translation data, which host memory may be more rapidly accessed than the flash memory (NAND) of the storage device itself.

When the controller obtains a host command (e.g., a read command or a write command) including an associated logical address where host data may be stored, the controller may first check if an associated L2P mapping table entry already exists in the SRAM, in which case the controller may proceed to translate the logical address of the data to a physical address in NAND flash memory and execute the command (e.g., read or write the user data) at that physical address. If the L2P mapping table entry is not present in SRAM, then before resorting to reading the flash memory for the mapping, the controller may check whether this mapping is stored in the HMB. If the mapping is stored in the HMB, the controller may issue an HMB read request to the host to transfer the mapping to the SRAM of the storage device. After the mapping is stored in the SRAM in response to the HMB read request, the controller may fetch the mapping and execute the command.

Currently, the amount of L2P address translation data that the controller may obtain in a single HMB read request (the HMB transfer size) is fixed based on the size of a memory slot in the SRAM where this translation data is stored. For example, if the size of a single memory slot in an HMB read buffer is 128 bytes, the HMB transfer size for a single HMB read request may be similarly fixed to 128 bytes to accommodate the memory slot size. For small host commands (e.g., a read command for 128 kB or less of host data), this quantity of bytes may be sufficient to cover the host data associated with the host command in one HMB read request. For example, if a host command includes 128 kB of host data and an HMB transfer size of 128 bytes of L2P address translation data also encompasses 128 kB (or kiB) of host data, then one HMB read request may be sufficient to obtain the entire L2P address translation data for the 128 kB host command. However, for large host commands (e.g., a read command for 1 MB of host data), this quantity of bytes may not be sufficient to cover the host data associated with the host command in one HMB read request. For example, if a host command includes 1 MB of host data but an HMB transfer size of 128 bytes of L2P address translation data encompasses only 128 kB (or kiB) of host data, then eight HMB read requests may be required to obtain the L2P address translation data for the 1 MB host command (i.e., 128 kB*8 requests=1 MB). As each HMB read request for L2P address translation data adds latency in completing the associated host command, such large host commands may result in significant latency and reduced performance in executing such host commands.

Accordingly, to improve performance of the storage device, a controller of a storage device may apply a dynamic HMB transfer size for HMB read requests to efficiently read L2P address translation data from an HMB with minimal latency. For instance, the controller may apply a dynamic HMB transfer size for a single HMB read request based on the host data length of the associated host command and/or based on a quantity of contiguous memory locations available in the HMB read buffer, rather than apply a static HMB transfer size based on the size of the memory slot in the HMB read buffer as previously described. To determine the HMB transfer size to associate with an HMB read request, the controller may identify the host data length associated with the host command, and then the amount of free contiguous memory slots in the HMB read buffer that would be required to accommodate L2P address translation data for this host data length. The controller may search the HMB read buffer for free contiguous memory slots, and if the quantity of free contiguous memory slots the controller finds is the same as the amount required to accommodate the entire L2P address translation data, the controller may set the HMB transfer size associated with the HMB read request to the total size of the required amount of memory slots. As a result, the controller may obtain the entire L2P address translation data for the host command in response to a single HMB read request.

For instance, assume in one example that a host command includes a 1 MB data length, a memory slot size of the HMB read buffer is 128 bytes, and 128 bytes of L2P address translation data encompasses 128 kB or kiB of host data. In such case, eight free and contiguous, 128 byte memory slots would be required to accommodate the entire, 1 KB of L2P address translation data (128 bytes per slot*8 slots=1 KB) for the 1 MB host command. Therefore, if the controller locates eight contiguous and free memory slots in the HMB read buffer, the controller may dynamically set the HMB transfer size to 1 KB, rather than statically fixing the HMB transfer size to 128 bytes based on the individual memory slot size as previously described. As a result, instead of statically sending eight HMB read requests to obtain the 1 KB of L2P address translation data as previously described, here the controller may dynamically send one HMB read request for the entire 1 KB of L2P address translation data. Thus, reduced latency in obtaining the L2P address translation associated with the command may be achieved.

On the other hand, if the controller determines that the HMB read buffer includes a quantity of free contiguous memory slots that is less than the amount required (e.g., less than eight in the aforementioned example), the controller may set the HMB transfer size to the total size of the free contiguous memory slots the controller actually found. For instance, assume as an alternative to the 1 MB host command example above, that the controller locates four free and contiguous 128 byte memory slots in the HMB read buffer, which may accommodate 512 bytes of L2P address translation data (128 bytes per slot*4 slots=512 bytes) out of the 1 KB of entire L2P address translation data required to address the 1 MB host command. In such case, the controller may dynamically set the HMB transfer size for one HMB read request to 512 bytes, rather than statically fixing the HMB transfer size to 128 bytes as previously described. Similarly, if the controller locates an additional four free and contiguous 128 byte memory slots in the HMB read buffer (which are not contiguous with the aforementioned four other slots), these slots may accommodate the remaining 512 bytes out of the 1 KB of L2P address translation data, and the controller may similarly set the HMB transfer size for another HMB read request dynamically to 512 bytes. As a result, instead of statically sending eight HMB read requests to obtain the 1 KB of L2P address translation data as previously described, here the controller may dynamically send two HMB read requests in total for the entire 1 KB of L2P address translation data. Therefore, even with fewer, free contiguous memory slots in the HMB read buffer, performance may still be improved since the controller may obtain the entire L2P address translation data for the host command in response to fewer HMB read requests using the dynamic HMB transfer size approach than using the aforementioned static HMB transfer size.

Accordingly, the controller may set the HMB transfer size for a respective HMB read request to be the minimum value between: the total size of the number of memory slots required to store the entire L2P address translation data for the host command (e.g., 1 KB in the case where eight, 128 byte slots are required to sufficiently address a 1 MB command), and the total size of a number of free, contiguous memory slots in the HMB read buffer available to store L2P address translation data for the host command (e.g., 512 bytes in the case where only four, 128 byte slots are available to store L2P address translation data for the 1 MB command). For instance, in the aforementioned example where the memory slot size is 128 bytes, the total size of memory slots to address the host command is 1 KB, and the total size of free, contiguous memory slots located in the SRAM is 512 bytes, in such example the HMB transfer size per HMB read request would be the minimum between 1 KB and 512 bytes, or 512 bytes in this case. Thus, even if the HMB read buffer includes multiple free and contiguous memory slots less than the quantity required to satisfy the L2P address translation of the host command, reduced latency in obtaining the L2P address translation associated with the command may still be achieved.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host 104 may also include a host memory buffer (HMB 105). The HMB 105 is a portion of host memory (e.g., host memory 103 or a different memory in host 104) that the host 104 may allocate to the storage device 102 to utilize for the storage device's own purposes. For instance, the storage device 102 may utilize the HMB 105 as an address mapping table cache or a data cache. In some examples, the HMB 105 may include volatile memory, such as RAM, DRAM, or SDRAM (e.g., DDR1, DDR2, DDR3, DDR3L, LPDDR3, DDR4, and the like). In other examples, the HMB 105 may include non-volatile memory.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, Hiper-LAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of NVM memory locations 112 which may store system data for operating the storage device 102 or user data received from the host for storage in the storage device 102. For example, the NVM may have a cross-point architecture including a 2-D NAND array of NVM memory locations 112 having n rows and in columns, where in and n are predefined according to the size of the NVM. In the exemplary embodiment of FIG. 1, each NVM memory location 112 may be a die 114 including multiple planes each including multiple blocks of multiple cells 116. Alternatively, each NVM memory location 112 may be a plane including multiple blocks of the cells 116. The cells 116 may be single-level cells, multi-level cells, triple-level cells, quad-level cells, and/or penta-level cells, for example. Other examples of NVM memory locations 112 are possible; for instance, each NVM memory location may be a block or group of blocks. Each NVM memory location may include one or more blocks in a 3-D NAND array. Each NVM memory location 112 may include one or more logical blocks which are mapped to one or more physical blocks. Alternatively, the memory and each NVM memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the NVM memory locations 112. As an example, FIG. 1 illustrates data 119 being stored in different NVM memory locations 112, although the data may be stored in the same NVM memory location. In another example, the NVM memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the NVM memory locations 112 of NVM to avoid unduly obscuring the concepts of FIG. 1, the L2P mapping table 120 in fact may include multiple tables stored in one or more NVM memory locations of NVM.

Figure 2:
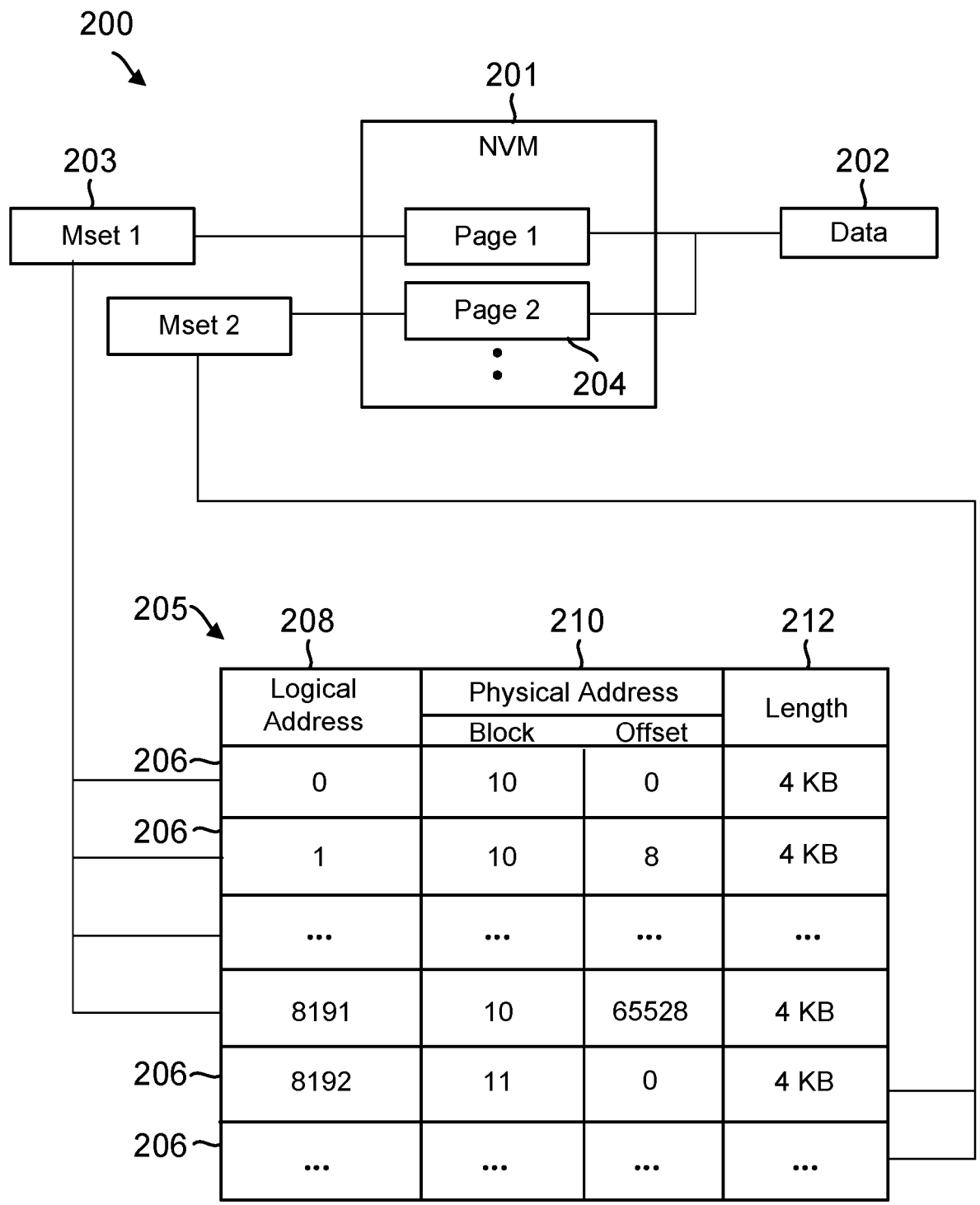
FIG. 2 is a conceptual diagram illustrating an example of a logical-to-physical mapping (L2P) table in a non-volatile memory of the storage device of FIG. 1.

FIG. 2 is a conceptual diagram 200 of an example of an L2P mapping table 205 illustrating the mapping of data 202 received from a host device to logical addresses and physical addresses in NVM 201 (e.g., the NVM 110 of FIG. 1). The data 202 may correspond to the data 119 in FIG. 1, while the L2P mapping table 205 may correspond to the L2P mapping table 120 in FIG. 1. In one example, the data 202 may be stored in one or more pages 204 (e.g., physical pages) in NVM 201. Each page 204 may be associated with a mapping set (Mset 203) including one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size). In the illustrated example, page 204 encompassing 32 KB of data 202 may be associated with an Mset 203 (e.g., Mset 1) including 8192, 4 KB entries respectively occupying 4 bytes of memory. However, in other examples, page 204 may encompass a different amount of host data (e.g. other than 32 KB of host data), Mset 203 may include a different number of entries 206 (e.g., other than 8192 entries), entries 206 may respectively include different host data lengths (e.g., other than 4 KB each), or entries 206 may respectively occupy different amounts of memory (e.g., other than 4 bytes each).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller may check if the mapping is present in the HMB 105 (e.g., if the HMB is utilized by storage device 102 as an address mapping cache). If the mapping is also not present in the HMB 105 or the HMB 105 is not utilized by the storage device 102, then the controller accesses the L2P mapping table 120 in NVM 110, 201 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each NVM memory location 112 in NVM where data is being read.

The NVM 110 includes sense amplifiers 124 and data latches 126 connected to each NVM memory location 112. For example, the NVM memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the NVM memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the NVM memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a system on a chip (SoC), a Field Programmable Gate Array (FPGA), hard-wired logic, analog circuitry and/or a combination thereof.

The controller 123 is configured to receive data transferred from one or more of the cells 116 of the various NVM memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a NVM memory location 112 in the NVM 110 of storage device 102 for storing the data. The controller 123 stores the L2P mapping in the NVM (and the cache 122 or HMB 105) to map a logical address associated with the data to the physical address of the NVM memory location 112 allocated for the data. The controller also stores the length of the L2P mapped data. The controller 123 then stores the data in the NVM memory location 112 by sending it to one or more data latches 126 connected to the allocated NVM memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122, HMB 105, or otherwise the NVM to translate the logical addresses specified in the read command to the physical addresses indicating the location of the data. The controller 123 then reads the requested data from the NVM memory location 112 specified by the physical addresses by sensing the data using the sense amplifiers 124 and storing them in data latches 126 until the read data is returned to the host 104 via the host interface 106.

If the HMB 105 is utilized by storage device 102 as an address mapping cache, the controller 123 may store Msets (e.g., Mset(s) 203) or L2P mapping entries (e.g., entries 206) in the HMB 105. To access the L2P mapping in the HMB 105 when executing a host command including data associated with that L2P mapping, such as a read command, the controller 123 transmits a HMB read request to the host 104 via host interface 106, and then the host 104 transfers the L2P mapping to the volatile memory 118 (e.g., into an HMB read buffer in cache 122 or elsewhere in volatile memory 118) again via host interface 106. Once the L2P mapping(s) are stored in the HMB read buffer, the controller 123 may fetch the L2P mapping(s) from the volatile memory 118 and complete execution of the host command. For example, the controller may pass the physical address indicated in the L2P mapping to a physical sequencer (not shown) in the storage device 102, which activates the sense amplifiers 124 and/or latches 126 to read or write data to the NVM 110, 201 as previously described.

Figure 3:
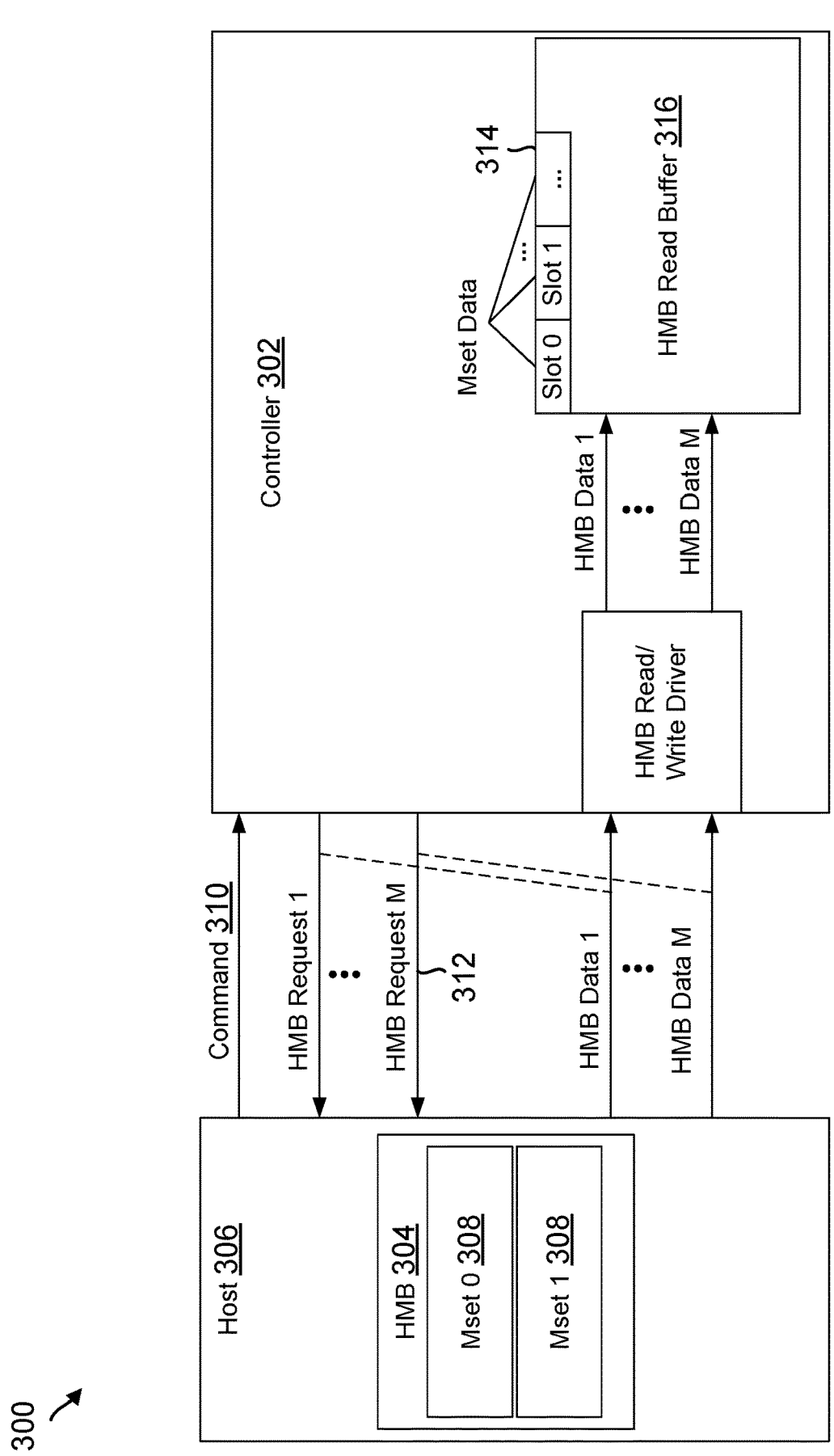
FIG. 3 is a conceptual diagram illustrating an example of a controller in the storage device of FIG. 1 which utilizes an HMB for storing L2P address translation data.

FIG. 3 illustrates an example 300 of a controller 302 (e.g., an ASIC or a SoC) in the storage device 102 of FIG. 1 which utilizes an HMB 304 of a host 306 for storing L2P address translation data. For instance, HMB 304 may include one or more Msets 308 (e.g., Mset(s) 203) including a plurality of L2P mapping entries associated with a sequence of logical addresses. In the illustrated example, HMB 304 may include two Msets 0 and 1 respectively encompassing different ranges of LBAs, such as entries 206 for LBAs 0-8191 in Mset 0 and entries 206 for LBAs 40960-49151 in Mset 1, although there may be more or less Msets in respectively encompassing different LBAs or quantities of LBAs in other examples. In response to receiving a command 310 from the host 306 such as a read command including a logical address in one of the Mset(s) 308 (and failing to locate associated L2P mapping entries for the command in cache), the controller 302 determines a quantity (1 through M) of HMB read requests 312 to transmit to the host 306 to obtain the L2P mapping entries associated with command 310 from HMB 304. This quantity is dependent on a size of L2P address translation data which, in response to a single HMB read request, may be transmitted from host 306 over an interface (e.g., via DDR) to a memory slot 314 within an HMB read buffer 316 in volatile memory (e.g., SRAM) of the storage device (e.g., via an HMB read/write driver controlled by controller 302). In turn, the size of L2P address translation data that may be transferred from HMB 304 to memory slot 314 (the HMB transfer size) in response to a single HMB read request is based on SRAM limitations in the storage device 102, namely a fixed allocated size of the memory slot 314 in the HMB read buffer 316. For example, if the allocated memory slot size is 128 bytes, the HMB transfer size associated with a single HMB read request may similarly be limited to 128 bytes.

For host commands associated with relatively small amounts of data (e.g., 128 KB or less), this fixed HMB transfer size may be sufficient to allow the controller 302 to transmit a single HMB read request for the entire L2P address translation data associated with command 310. For example, if each L2P mapping entry occupies 4 bytes of memory and a HMB transfer size of 128 bytes of L2P mapping entries are transmitted to memory slot 314, the L2P address translation data received in response to a single HMB read request may cover translations for the entire 128 kB of host data associated with the command. Thus, in the example of FIG. 3, if command 310 includes a host data length of 128 kB, the controller 302 may transmit only one HMB request (e.g., M=1) and one 128 byte transfer of HMB data (M=1) may be stored in one of the memory slots 314 of HMB read buffer 316. However, for host commands associated with relatively large amounts of data (e.g., more than 128 KB, such as 1 MB), this fixed HMB transfer size may no longer be sufficient to retrieve the entire L2P address translation data associated with command 310. For example, if each L2P mapping entry occupies 4 bytes of memory and the HMB transfer size is 128 bytes as previously described (such that one HMB read request covers translations for 128 kB of host data), eight HMB read requests may be required to obtain the entire L2P address translation data associated with the command 310 (e.g., 128 KB per HMB read request*8 HMB read requests=1 MB). Thus, in the example of FIG. 3, if command 310 includes a host data length of 1 MB, the controller 302 may transmit eight HMB requests (e.g., M=8) and eight, 128 byte transfers of HMB data (M=8) may be stored respectively in eight of the memory slots 314 of HMB read buffer 316.

In either example, after the L2P address translation data (e.g., the L2P mapping entries) for command 310 is received and stored in HMB read buffer 316, the controller 302 may fetch the entries and proceed to execute the command 310. However, while the latency for completion of a host command associated with a relatively small amount of data (e.g., 128 KB) may be small as a result of only a single HMB read request and HMB data transfer being performed, the latency for completion of a host command associated with a relatively large amount of data (e.g., 1 MB) may be large as a result of several HMB read requests and HMB data transfers being performed. Thus, larger host commands may result in reduced system performance compared to smaller host commands. Additionally, due to the latency involved in completing several HMB read requests and HMB data transfers for large read commands, a physical sequence (PS) layer of the controller 302 may not apply read cache commands since an insufficient number of such large read commands may be populated in the memory die being read. For example, large read commands may not be stored quickly enough in a read cache for a memory die in a backend of the controller 302 to accommodate advance reads of that die, potentially resulting in too few commands being cached at the time of the read and therefore leading to execution of such large commands outside of read cache in a less time-efficient manner.

Figure 4:
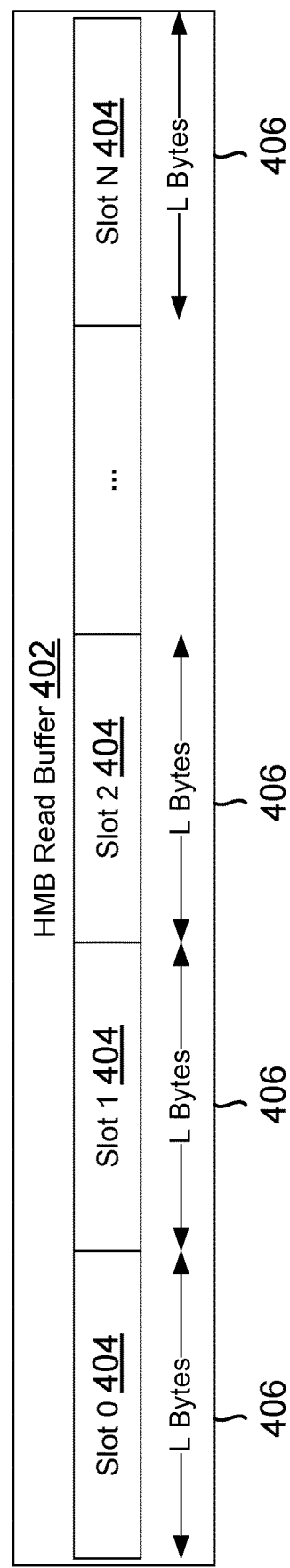
FIG. 4 is a conceptual diagram illustrating an example of an HMB read buffer in volatile memory of the storage device of FIG. 1 for storing L2P table address translation data read from the HMB.

FIG. 4 illustrates an example 400 of an HMB read buffer 402 in volatile memory (e.g., HMB read buffer 316 in SRAM of the storage device 102) including a plurality of memory slots 404 (1 through N) for storing L2P address translation data obtained from an HMB. The controller 123, 302 may allocate a fixed size 406 (a number L bytes) for each of the memory slots 404, which size is based on achieving a balance between address translation throughput and HMB transfer latency. For example, the controller may allocate each memory slot to have L=128 bytes, since 128 bytes may provide a balance between a number of L2P address translations obtained in an HMB read request and a number of HMB read requests required for obtaining the L2P address translations. For example, for smaller host commands (e.g., 4 KB commands), too large a value of L may result in a significant number of unrelated L2P mapping entries being fetched from the HMB and thus reduce the bandwidth or throughput available for reads and writes, while for larger commands (e.g., 256 KB commands), too small a value of L may result in a significant number of HMB read requests being transmitted to obtain the L2P mapping entries associated with the command and thus result in increased latency for executing reads and writes. Thus, a memory slot size of L=128 bytes may provide a middle ground between these two competing considerations, although it should be understood that the memory slot size L is not limited to 128 bytes and may be allocated with a different size (e.g., L=256 bytes, L=64 bytes, etc.) according to the degree of balance (e.g., between throughput and latency) required by the controller.

To obtain L2P mapping entries for a read command from the HMB, the controller may search the HMB read buffer 402 for free (unused) memory slots in fixed units of these L bytes. Once the controller finds a free slot, the controller provides to the host 104, 306 the memory address of that memory slot 404 in an HMB read request (e.g., HMB read request 312) associated with an HMB transfer size similarly of L bytes. After the HMB data is fetched in response to the HMB read request (e.g., the L bytes of L2P mapping entries are loaded into the memory slot and submitted to the PS for execution), the controller may free that memory slot for future use. Thus, to execute a 1 MB read command, the controller may provide to the host the memory address of eight respective, free memory slots of the HMB read buffer in eight respective HMB read requests, and wait until the L2P mapping entries are respectively loaded into those eight memory slots before completing execution of the read command. The memory slots may be non-contiguous so long as they are free (unused). As the slot sizes and HMB transfer sizes are fixed to L bytes irrespective of the size of the read command, large read commands such as 1 MB read commands may result in significant HMB transfer latency and thus reduced system performance. More generally, a large command resulting in increased HMB transfer latency may refer to a command including a host data length that is larger than a quantity of L2P address translation data that may be transferred into an L-byte memory slot of the HMB read buffer. For example, if L=128 bytes, each L2P mapping entry occupies 4 bytes of memory, and thus the quantity of L2P address translation data that may fit into a 128 byte memory slot covers 128 kB of host data, a large read command resulting in increased HMB transfer latency may refer to a read command (sequential or random) that includes a host data length of more than 128 kB in this example, since such commands would require more HMB read requests than commands of 128 kB or less. Therefore, it would be helpful to improve read performance by reducing the HMB transfer latency for such large commands.

Accordingly, to improve read performance for large commands, the controller 123, 302 of the storage device 102 may apply a dynamic HMB transfer size to its HMB read requests based on a size of the host command or based on a quantity of free and contiguous memory slots in the HMB read buffer, rather than apply a static HMB transfer size based on memory slot size as previously described. In one example, in response to receiving a host command, the controller may determine the associated host data length (the command size), and determine the quantity of contiguous memory slots in the HMB read buffer that would be required to accommodate the command size. For example, if the controller receives a 1 MB read command and each memory slot of the HMB read buffer is 128 bytes in length, the controller may determine that eight contiguous memory slots may accommodate the 1 KB of L2P address translation data for the 1 MB read command. The controller may then search the memory space allocated for the HMB read buffer for the required quantity of free and contiguous memory slots (e.g., eight in this example). If the controller locates this quantity of slots, the controller may send a single HMB read request to the host to fetch the L2P address translation data for the associated host command into the memory slots. For example, in the case of a 1 MB read command, if the controller locates eight free and contiguous memory slots (each spanning 128 bytes) in the HMB read buffer, the controller may transmit a single HMB read request indicating the memory address of the initial memory slot and indicating an HMB transfer size of 1 KB, and the 1 KB of L2P address translation data may accordingly be transferred and loaded into the memory slots in response to the single HMB read request. Thus, unlike the static approach previously described where the controller may send 8 HMB read requests with 128 byte HMB transfer sizes to satisfy a 1 MB host command and where the HMB data is stored in any free slot (whether contiguous or non-contiguous), here using the dynamic approach the controller may more efficiently send 1 HMB read request with a 1 KB HMB transfer size and the HMB data may be stored in free, consecutive or contiguous slots (beginning with the memory address indicated in the HMB read request). Thus, reduced HMB transfer latency for large commands may be achieved.

Figure 5:
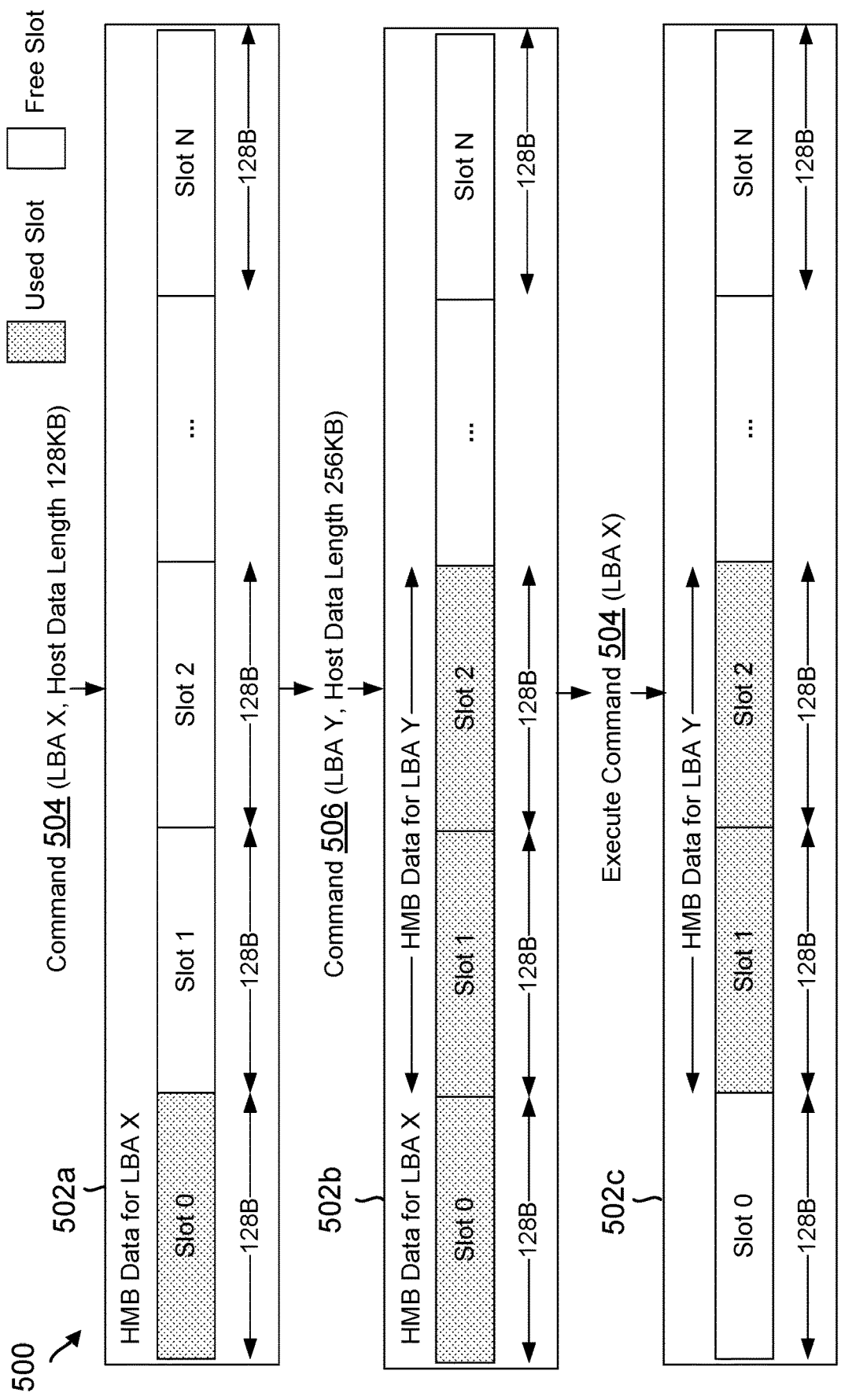
FIG. 5 is a conceptual diagram illustrating an example of the state of an HMB read buffer in volatile memory of the storage device of FIG. 1 following receipt and execution of host commands.

FIG. 5 illustrates an example 500 of an HMB read buffer 502 (HMB read buffer 502a, 502b, 502c, e.g., HMB read buffer 316, 402) including HMB data obtained from an HMB, using HMB read requests associated with dynamic HMB transfer sizes, following receipt and execution of different host commands. In the illustrated example, the controller 123, 302 receives a command 504 including LBA X having a host data length of 128 kB (e.g., command 504 is a 128 kB command). In response to receiving the command 504, the controller may determine that one 128 byte memory slot would be sufficient to accommodate the HMB data for the 128 kB command, and therefore the controller may search the HMB read buffer for one free slot. Upon locating free Slot 0, the controller may allot that slot for command 504, and the controller may send one HMB read request for the associated, 128 bytes of L2P address translation data to be loaded into Slot 0. Thus, in HMB read buffer 502a, Slot 0 may store HMB data for LBA X following the HMB data transfer. Next, the controller receives a command 506 including LBA Y having a host data length of 256 kB (e.g., command 506 is a 256 kB command). In response to receiving command 506, the controller may determine that two 128 byte memory slots would be sufficient to accommodate the HMB data for the 256 kB command, and therefore the controller may search the HMB read buffer for two contiguous and free slots. Upon locating free Slots 1 and 2, the controller may allot those slots for command 506, and the controller may send one HMB read request for the associated, 256 bytes of L2P address translation data to be loaded into Slots 1 and 2. Thus, in HMB read buffer 502b, Slots 1 and 2 may store HMB data for LBA Y following the HMB data transfer. Once the controller begins executing command 504 including LBA X (e.g., the translation for LBA X is completed and the translated physical address is passed to the PS for issuing the NAND read), the controller may free Slot 0 of its HMB data for future use. Thus, in HMB read buffer 502c, Slot 0 may be freed of HMB data for LBA X following initiation of command execution.

Figure 6:
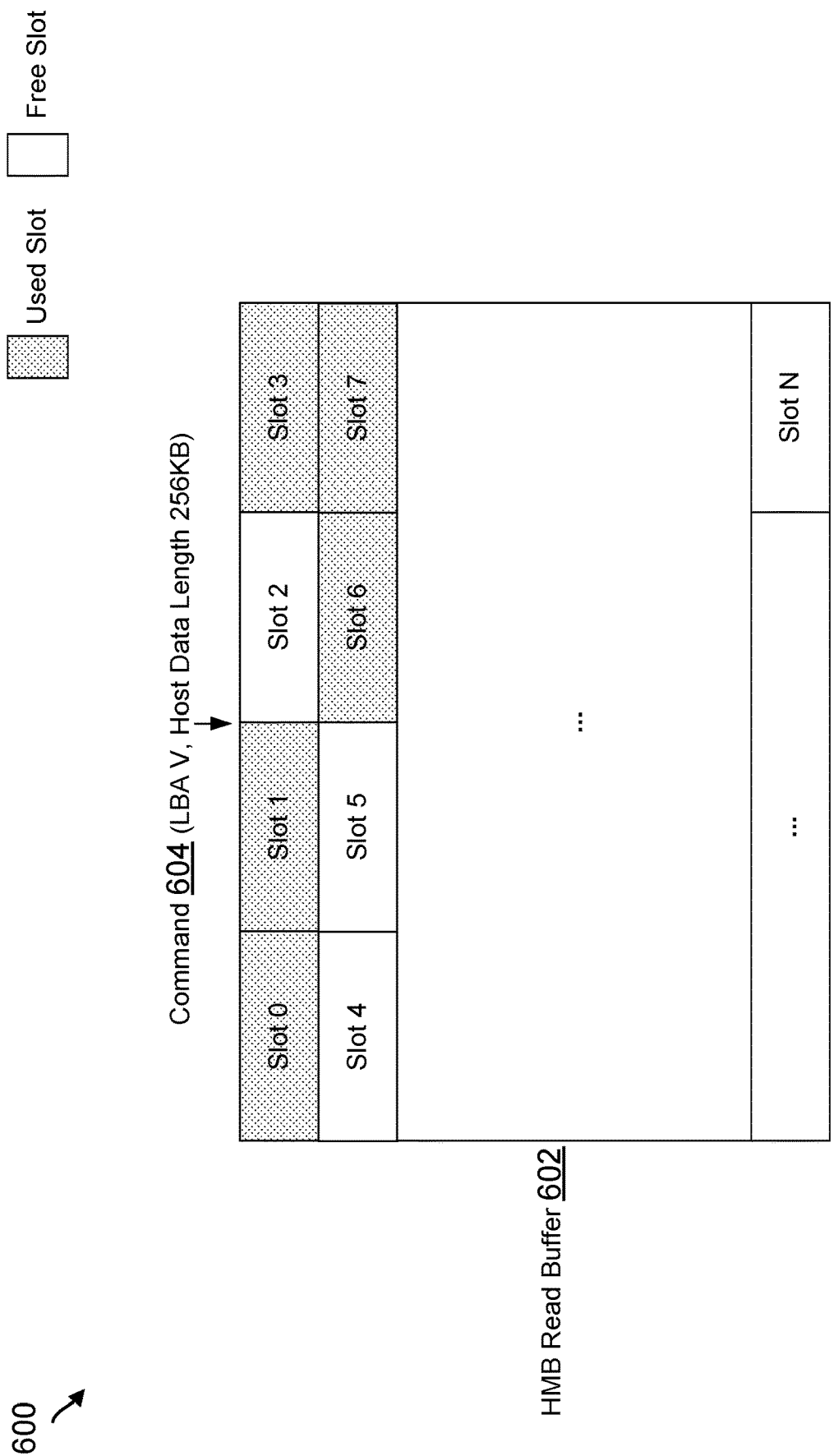
FIG. 6 is a conceptual diagram illustrating another example of an HMB read buffer in volatile memory of the storage device of FIG. 1 following receipt and execution of a host command.

FIG. 6 illustrates an example 600 of an HMB read buffer 602 (e.g., HMB read buffer 316, 402, 502) including HMB data obtained from an HMB, using HMB read requests associated with dynamic HMB transfer sizes, following receipt and execution of different host commands. In the illustrated example, the controller 123, 302 receives a command 604 including LBA V having a host data length of 256 kB (e.g., command 604 is a 256 kB command). In response to receiving command 604, the controller may determine that two memory slots would be sufficient to accommodate the HMB data for the 256 kB command, and therefore the controller may search the HMB read buffer for two contiguous and free slots. During the search, in this example, the controller may determine that Slots 0 and 1 are used by other HMB data for other command(s), that Slot 2 is free, and that Slot 3 is used by other HMB data for another (or same) command. Since Slot 2 is merely one slot and may only store part of the L2P address translation data associated with the 256 kB command (e.g., address translations for 128 kB of the 256 KB of host data), the controller continues its search for the required quantity of slots (two in this example). In response to continuing its search in this example, the controller may determine that Slots 4 and 5 are free. Therefore, upon locating free Slots 4 and 5, the controller may allot those slots for command 604, and the controller may send one HMB read request for the associated, 256 bytes of L2P address translation data to be loaded into Slots 4 and 5. Thus, rather than storing the L2P address translation data across non-contiguous slots statically based on a fixed memory slot size, the HMB data may be stored in contiguous slots of the HMB read buffer dynamically based on the command size and the quantity of contiguous memory slots available, reducing HMB transfer latency. For instance, rather than statically providing two HMB transfer requests with respective slot addresses for the 256 kB command and storing the received HMB data in free slots associated with the respective slot addresses as previously described, here the controller may dynamically provide one HMB transfer request with one slot address for the 256 kB command and store the received HMB data in contiguous and free slots starting from the indicated slot address, improving read performance.

Figure 7:
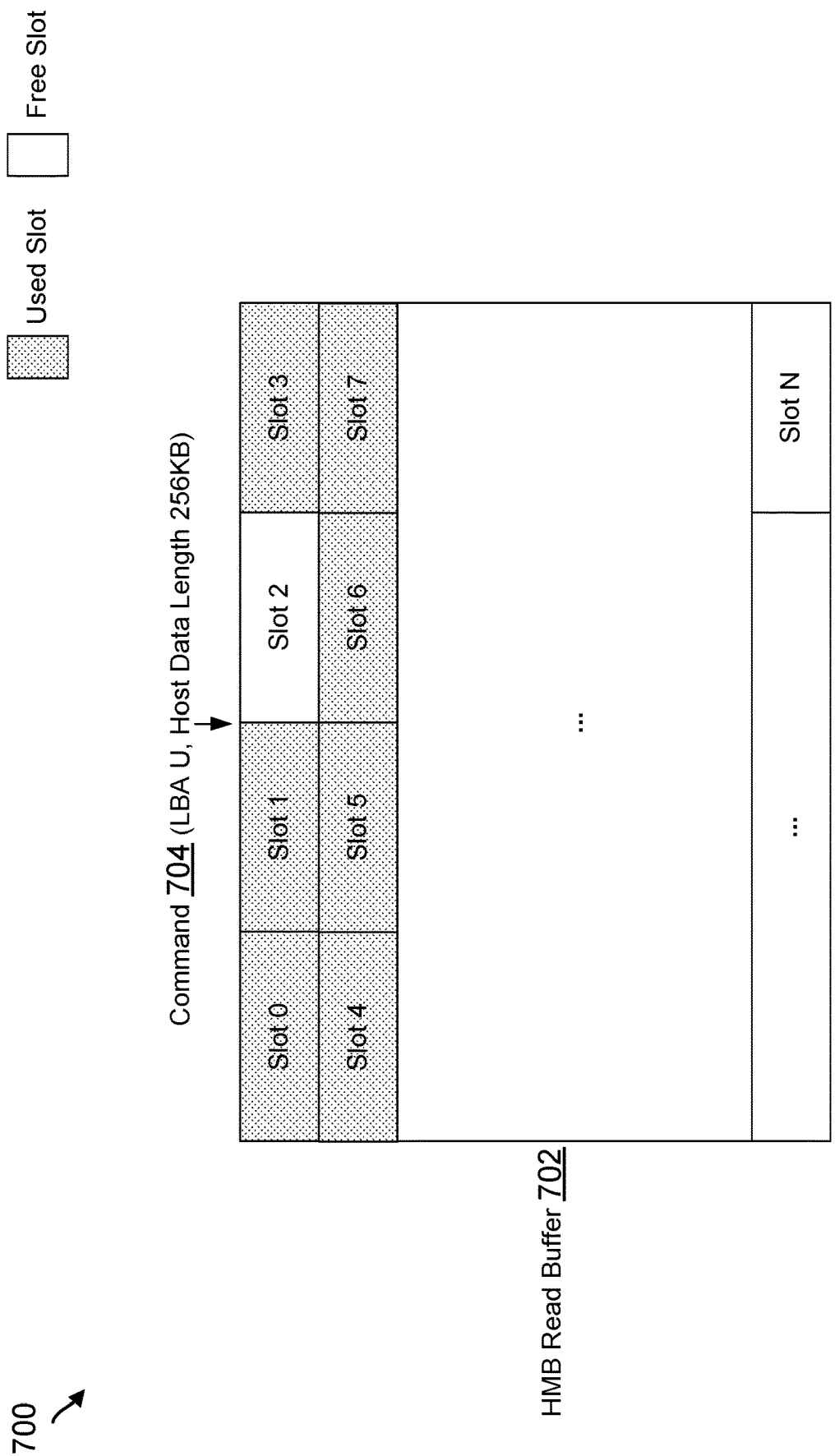
FIG. 7 is a conceptual diagram illustrating another example of an HMB read buffer in volatile memory of the storage device of FIG. 1 following receipt and execution of a host command.

FIG. 7 illustrates an example 700 of an HMB read buffer 702 (e.g., HMB read buffer 316, 402, 502) including HMB data obtained from an HMB, using HMB read requests associated with dynamic HMB transfer sizes, following receipt and execution of different host commands. In the illustrated example, the controller 123, 302 receives a command 704 including LBA U having a host data length of 256 kB (e.g., command 704 is a 256 kB command). In response to receiving command 704, the controller may determine that two memory slots would be sufficient to accommodate the HMB data for the 256 kB command, and therefore the controller may search the HMB read buffer for two contiguous and free slots. During the search, in this example, the controller may determine that Slots 0 and 1 are used by other HMB data for other command(s), that Slot 2 is free, and that Slot 3 is used by other HMB data for another (or same) command, similar to example 600 of FIG. 6. Since Slot 2 is merely one slot and may only store part of the L2P address translation data associated with the 256 kB command (e.g., address translations for 128 kB of the 256 KB of host data), the controller continues its search for the required quantity of slots (two in this example), again similar to the example 600 of FIG. 6. However, unlike the example 600 of FIG. 6, here in response to continuing its search in this example, the controller may determine that Slots 4 and 5 are used by other HMB data for other command(s). Moreover, the controller may determine from its search that no other pair of free and contiguous slots exists in the HMB read buffer 702, but that single free and individual, non-contiguous slots do exist in the HMB read buffer such as Slot 2. Therefore, the controller may end up allotting Slot 2 and another individual, non-contiguous slot (e.g., Slot N) for command 704, and the controller may end up sending two, 128 byte HMB read requests respectively for the associated, 256 bytes of L2P address translation data to be loaded respectively into the individual slots.

Thus, the controller may end up sending more HMB read requests in the example 700 of FIG. 7 than in the example 600 of FIG. 6 for the same command size. The controller may operate in this manner since, even though the command size in both examples is 256 kB and the associated L2P address translation data may thus be stored in both examples in two free and contiguous memory slots of the HMB read buffer, the minimum number of slots that actually are free and contiguous in the HMB read buffer in example 700 of FIG. 7 is less than in example 600 of FIG. 6 (i.e., one in the example 700 of FIG. 7 in contrast to two in the example 600 of FIG. 6). Therefore, the HMB transfer size for a given HMB read request may be considered to be equal to the minimum value between: the total size of the number of memory slots required to store the entire L2P address translation data for the host command, and the total size of a number of free, contiguous memory slots in the HMB read buffer available to store L2P address translation data for the host command. An example showing how this minimum value consideration may result in different quantities of HMB read requests for a same read command size is depicted below in Table 1:

TABLE 1

| Read Command Size | HMB Read Iterations (Static Approach) | HMB Read Iterations (Dynamic Approach) | Contiguous Free Slots | Savings (HMB Read Iterations) |
| --- | --- | --- | --- | --- |
| 1 MB | 8 | 1 | 8 | 7 |
| 1 MB | 8 | 2 | 4 | 6 |
| 1 MB | 8 | 8 | 1 | 0 |

In addition to dynamically basing the HMB transfer size for a given HMB read request on the command size of a single, current host command being handled (e.g., executed), the controller may dynamically base the HMB transfer size on a combined command size of multiple host commands. For instance, if the controller receives sequential read commands from the host, the controller may obtain the associated L2P address translation data for the multiple sequential read commands (e.g., a current command for execution and a subsequent command for execution) in response to a single HMB read request. As an example, when the controller 123, 302 determines the quantity of HMB read requests required for execution of a read command including LBAs 0-500 (covering 256 kB of host data) using the aforementioned dynamic approach, the controller may check the LBAs associated with one or more subsequent read commands and determine if those commands include LBAs which are in a sequential order with respect to the current read command. For example, the controller may determine that a subsequent read command includes LBAs 501-1000 (also covering 256 kB of host data), which is sequential with respect to LBAs 0-500 in the current read command. In such case, the controller may determine to base its requested HMB transfer size on the total command size of the two commands (e.g., 512 kB for both commands in this case), and thus search for free and contiguous memory slots in the HMB read buffer that can accommodate the L2P address translation data for both commands (e.g., four 128-byte slots in this case). If the search for four contiguous and free slots is successful, the controller may send a single HMB read request for 512 bytes of HMB data to be stored in the four slots (e.g., the first 256 bytes covering 256 kB of address translation data in the first two slots and the second 256 bytes covering 256 kB of address translation data in the last two slots).

On the other hand, if the search is unsuccessful (e.g., the controller locates only three contiguous and free slots in this example), then as a result of the minimum value consideration described above, the controller may send one HMB read request for 384 bytes of HMB data to be stored in the three contiguous slots (e.g., 256 bytes covering 256 kB of address translation data in the first two slots and 128 bytes covering 128 kB of address translation data in the third slot), and another HMB read request for the remaining 128 bytes of HMB data to be stored in another non-contiguous slot (e.g., 128 bytes covering 128 kB of address translation data in the fourth slot). Thus, fewer HMB read requests may still be transmitted using the dynamic HMB transfer size approach than using the static HMB transfer size approach even for multiple commands. For example, if the static approach was used based on fixed memory slot size, four HMB read requests would be required (e.g., 4*128 bytes=512 bytes), while the dynamic approach (based on the minimum between a required quantity of contiguous and free memory slots to accommodate the command size and an actual quantity of contiguous and free memory slots in the HMB read buffer) results in only two HMB read requests being sent.

Figure 8:
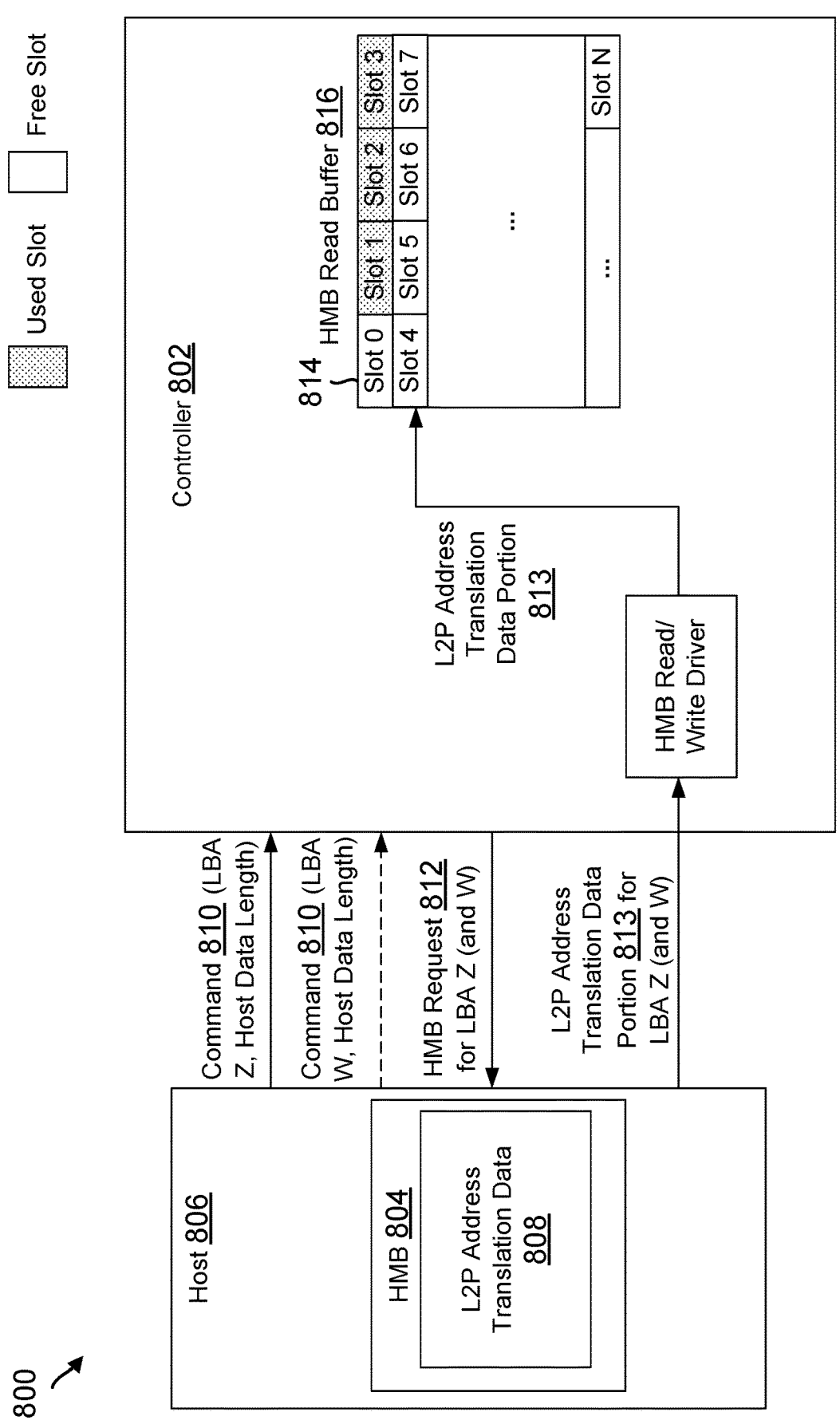
FIG. 8 is a conceptual diagram illustrating an example of a controller in the storage device of FIG. 1 which dynamically requests portions of L2P address translation data from an HMB for processing host commands.

FIG. 8 illustrates an example 800 of a controller 802 (e.g., controller 123, 302) in the storage device 102 of FIG. 1 which utilizes an HMB 804 (e.g., HMB 105, 304) of a host 806 (e.g., host 104, 306) for storing L2P address translation data 808 (e.g., one or more Msets 203, 308 including a plurality of L2P mapping entries associated with a sequence of logical addresses, such as entries 206 including logical addresses 208 and physical addresses 210) for different commands. In one example, controller 802 may receive command 810 from the host 806, such as a read command including LBA Z and a given host data length (e.g., 256 kB), and controller 802 dynamically determines a quantity of HMB read requests 812 to transmit to the host 806 to obtain a portion 813 of the L2P address translation data 808 which is associated with command 810 (e.g., the specific L2P mapping entries within the one or more Msets 203, 308 that relate to command 810 including LBA Z). In particular, the controller 802 may search for two 128-byte slots of the memory slots 814 within HMB read buffer 816 which are free and contiguous to accommodate the 256 kB host command, and upon determining that two contiguous slots 4 and 5 are free, the controller 802 may transmit one HMB read request including an HMB transfer size of 256 bytes to obtain the portion 813 of the associated L2P address translation data. In response to the HMB read request 812, the host 806 may transmit portion 813 to the controller 802, which may control an HMB read/write driver to load the portion 813 of L2P address translation data 808 into memory slots 4 and 5. During execution of command 810, the controller 802 may fetch the portion 813 of L2P address translation data 808 from the HMB read buffer 816 to identify the physical address associated with LBA Z, the controller may free memory slots 4 and 5 for later use, and the controller may read the data at the identified physical address.

In another example, controller 802 may receive multiple of commands 810 from the host 806, such as a first read command including LBA Z and a given host data length (e.g., 256 kB) and a second read command including LBA W and an associated host data length (e.g., 256 kB). The controller may determine if the commands 810 are sequential (e.g., the first read command includes LBAs Z=0-250 and the second read command includes LBAs W=251-500). If the commands are not sequential, then the controller 802 dynamically determines a quantity of HMB read requests 812 for the commands on an individual basis as previously described. However, if the commands are sequential, then the controller 802 may consider both commands when dynamically determining the quantity of HMB read requests 812 to transmit to the host 806. For instance, when executing one of the commands 810, the controller 802 may request to obtain the portion 813 of the L2P address translation data 808 which is associated with the combination of commands 810 (e.g., the specific L2P mapping entries within the one or more Msets 203, 308 that relate to the first read command including LBA Z and the second read command including LBA W). In particular, the controller 802 may search for four 128-byte slots of the memory slots 814 within HMB read buffer 816 which are free and contiguous to accommodate the two combined 256 kB host commands (effectively, a 512 kB sequential command), and upon determining that four contiguous slots 4-7 are free, the controller 802 may transmit one HMB read request including an HMB transfer size of 512 bytes to obtain the portion 813 of the associated L2P address translation data. In response to the HMB read request 812, the host 806 may transmit portion 813 to the controller 802, which may control the HMB read/write driver to load the portion 813 of L2P address translation data 808 into memory slots 4-7. During execution of the first read command, the controller 802 may fetch the portion 813 of L2P address translation data 808 from the HMB read buffer 816 to identify the physical address associated with LBA Z, the controller may free memory slots 4-7 for later use, and the controller may read the data at the identified physical address. During execution of the second read command, the controller 802 may identify the physical address associated with LBA W in the previously fetched portion 813 without sending another HMB read request, and the controller may read the data at the identified physical address as well.

In the illustrated example 800 of FIG. 8, the HMB read buffer 816 is shown internal to the controller 802. For instance, storage device 102 may be a DRAM-less device, in which case HMB read buffer 816 may be allocated within an SRAM internal to the ASIC or SoC controlling storage device 102 (e.g., volatile memory 118 including HMB read buffer 816 may be within controller 123, 302, 802). In other examples, the HMB read buffer 816 may be external to the controller 802. For instance, storage device 102 may include a DRAM, albeit with low memory capacity, located external to the ASIC or SoC controlling storage device 102, in which case HMB read buffer 816 may be allocated within the DRAM (e.g., volatile memory 118 including HMB read buffer 816 may be outside controller 123, 302, 802). Regardless of whether storage device 102 is a DRAM-less device or a low DRAM device, the controller 802 may be configured to dynamically determine HMB transfer sizes as described throughout this disclosure and transmit HMB read requests accordingly, since reduced HMB transfer latency and therefore command execution performance may similarly be improved notwithstanding whether the HMB read buffer is contained within SRAM or DRAM. However, the performance gain may be higher for DRAM-less devices than for storage devices including low capacity DRAM as a result of the higher memory capacity gains which HMBs can provide in DRAM-less devices.

Figure 9:
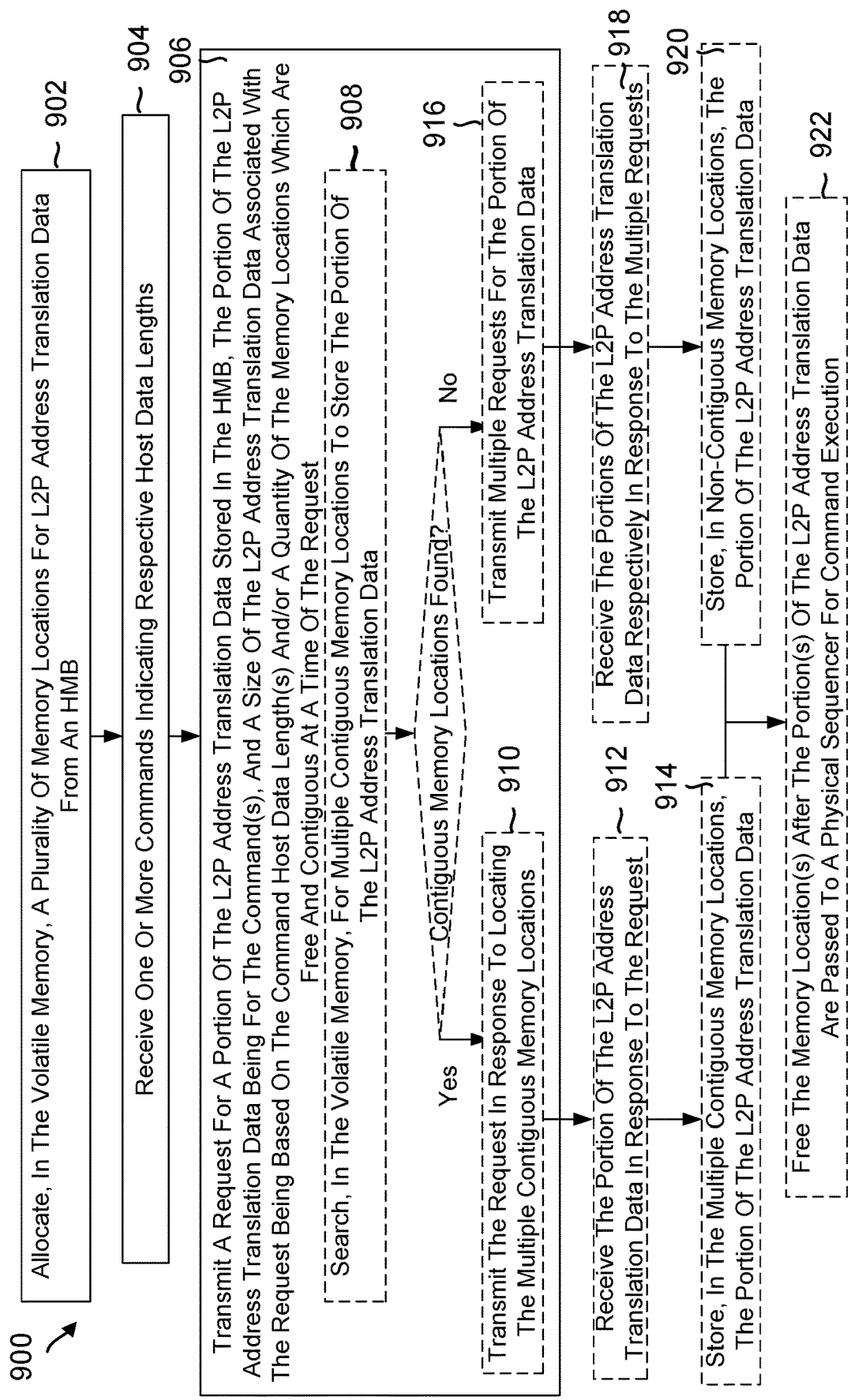
FIG. 9 is a flow chart illustrating an example of a method for requesting L2P address translation data from an HMB using a dynamically determined HMB transfer size, as performed by the storage device of FIG. 1.

FIG. 9 illustrates an example flow chart 900 of a method for requesting L2P address translation data from an HMB using a dynamically determined HMB transfer size. For example, the method can be carried out in a storage device 102 such as the one illustrated in FIG. 1. Optional aspects are illustrated in dashed lines. Each of the steps in the flow chart can be controlled using the controller as described below (e.g. controller 123, 302, 802), by a component or module of the controller, or by some other suitable means.

As represented by block 902, the controller may allocate, in volatile memory, a plurality of memory locations for L2P address translation data from an HMB. In one example, the volatile memory may be internal to the controller. In another example, the volatile memory may be external to the controller. For instance, referring to the Figures, controller 123, 302, 802 may allot memory slots 314, 404, 814 respectively of fixed size 406 (e.g., L bytes) within HMB read buffer 316, 402, 502, 602, 702 in volatile memory 118 for storing L2P address translation data 808 (e.g., entries 206 of L2P mapping table 120, 205 in one or more Msets 203, 308) obtained from HMB 105, 304, 804. In one example, volatile memory 118 may be internal to the controller 123, 302, 802 (e.g., SRAM internal to the ASIC or SoC controlling storage device 102), while in another example, volatile memory 118 may be external to the controller 123, 302, 802 (e.g., DRAM external to the ASIC or SoC controlling storage device 102).

As represented by block 904, the controller may receive one or more commands indicating respective host data lengths. For instance, referring to the Figures, controller 123, 302, 802 may receive command 310, 504, 506, 604, 704, 810 (e.g., a host read command or a host write command) indicating a plurality of logical addresses (e.g., logical address 208, such as LBA X, Y, V, U, or Z) and associated host data lengths (e.g., lengths 212). Moreover, controller 123, 302, 802 may receive multiple of such commands 810 including respective host data lengths, such as a first read command including LBA Z and a second read command including LBA W as illustrated in the example of FIG. 8.

As represented by block 906, the controller may transmit a request for a portion of the L2P address translation data stored in the HMB, the portion of the L2P address translation data being for the command(s). For instance, referring to the Figures, controller 123, 302, 802 may transmit HMB read request 312, 812 to host 104, 306, 806 for the portion 813 of the L2P address translation data 808 associated with the command 310, 504, 506, 604, 704, 810 received from the host. In one example, a size of the L2P address translation data associated with the request (the HMB transfer size) is based on the host data length(s) respectively indicated in the command(s). For instance, referring to the Figures, to obtain portion 813 of L2P address translation data 808 from the HMB 105, 304, 804, controller 123, 302, 802 may transmit HMB read request 312, 812 including a HMB transfer size dynamically determined from the host data lengths (e.g., lengths 212) associated with the logical addresses 208 indicated in command 310, 504, 506, 604, 704, 810. As an example, if the amount of memory occupied by the portion 813 of L2P address translation data 808 for the command 310, 504, 506, 604, 704, 810 is no greater than the fixed size 406 of the memory slot (e.g., if the memory slot size of the HMB read buffer is 128 bytes and no more than 128 bytes of 4 kB L2P mapping entries are required to accommodate the 128 kB command size or host data length), the controller may transmit a single HMB read request covering the entire L2P address translation data for the command.

In another example, a size of the L2P address translation data associated with the request (the HMB transfer size) transmitted at block 906 may be based on a quantity of the memory locations which are free and contiguous at a time of the request. For instance, referring to the Figures, to obtain portion 813 of L2P address translation data 808 from the HMB 105, 304, 804, controller 123, 302, 802 may transmit HMB read request 312, 812 including a HMB transfer size dynamically determined from the quantity of memory slots 314, 404, 814 that are unused by other HMB data and are adjacent with respect to each other in the HMB read buffer 316, 402, 502, 602, 702 at the time of the HMB read request. As an example, the controller may limit the HMB transfer size associated with a single HMB read request to the maximum total size of the memory slots 314, 404, 814 (e.g., the sum of their fixed sizes 406) that are free and contiguous at the time of the request. Thus, if a maximum of eight 128 byte, free and contiguous memory slots are available in the HMB read buffer for HMB data, the controller may transmit a single HMB read request for at most 1 kB of 4 kB L2P mapping entries; if a maximum of four 128 byte, free and contiguous memory slots are available in the HMB read buffer, the controller may transmit a single HMB read request for at most 512 bytes of 4 kB L2P mapping entries; and if a maximum of two 128 byte, free and contiguous memory slots are available in the HMB read buffer, the controller may transmit a single HMB read request for at most 256 bytes of 4 kB L2P mapping entries.

In a further example, the size of the L2P address translation data associated with the request may be based on a minimum of a size of the portion of the L2P address translation data for the command, and a total size of the quantity of the memory locations which are free and contiguous at the time of the request. For instance, referring to the Figures and Table 1 above, to obtain portion 813 of L2P address translation data 808 from the HMB 105, 304, 804, controller 123, 302, 802 may transmit HMB read request 312, 812 including a HMB transfer size dynamically determined from the host data lengths (e.g., lengths 212) associated with the logical addresses 208 indicated in command 310, 504, 506, 604, 704, 810 and the quantity of memory slots 314, 404, 814 that are unused by other HMB data and are adjacent with respect to each other in the HMB read buffer 316, 402, 502, 602, 702 at the time of the HMB read request. As an example, the controller 123, 302, 802 may determine the amount of memory occupied in the HMB 105, 304, 804 by the portion 813 of L2P address translation data 808 for the command 310, 504, 506, 604, 704, 810, compare this value with a maximum total size of the memory slots 314, 404, 814 (e.g., the sum of their fixed sizes 406) that would be free and contiguous at the time of the HMB read request, and the controller may set the HMB transfer size to the minimum of these two values. Thus, if the amount of memory occupied by the portion 813 of L2P address translation data 808 for the command 310, 504, 506, 604, 704, 810 is 1 kB (e.g., the command is a 1 MB command), and if a maximum of eight 128 byte, free and contiguous memory slots (totaling 1 kB in size) are available in the HMB read buffer for HMB data, the minimum between 1 kB and 1 kB is 1 kB, and so the controller may transmit a single HMB read request for the entire 1 kB of 4 kB L2P mapping entries associated with the 1 MB command. On the other hand, if a maximum of four 128 byte, free and contiguous memory slots (totaling 512 bytes in size) are available in the HMB read buffer, the minimum between 1 kB and 512 bytes is 512 bytes, and so the controller may transmit one HMB read request respectively for 512 bytes of the 4 kB L2P mapping entries associated with the 1 MB command and another HMB read request respectively for the remaining 512 bytes of the 4 kB L2P mapping entries associated with the 1 MB command.

In one example, the controller may transmit the request at block 906 based on a size of the portion of the L2P address translation data for the command being larger than a size of a respective one of the memory locations. For instance, referring to the Figures, before requesting to obtain portion 813 of L2P address translation data 808 from the HMB 105, 304, 804, the controller 123, 302, 802 may initially determine whether to apply a static HMB transfer size or a dynamic HMB transfer size based on the fixed size 406 of the memory slots 314, 404, 814. As an example, if the controller determines that the amount of memory occupied by the portion 813 of L2P address translation data 808 for the command 310, 504, 506, 604, 704, 810 is greater than the fixed size 406 of the memory slot (e.g., if the memory slot size of the HMB read buffer is 128 bytes and more than 128 bytes of 4 kB L2P mapping entries are required to accommodate the command size or host data length), then the controller may determine that increased HMB transfer latency may result from sending multiple HMB read requests respectively with a static HMB transfer size. As a result, the controller may dynamically determine the HMB transfer size to minimize the HMB transfer latency as previously described. For instance, the controller may dynamically determine the HMB transfer size associated with a single HMB read request from the host data lengths (e.g., lengths 212) associated with the logical addresses 208 indicated in command 310, 504, 506, 604, 704, 810 and/or and the quantity of memory slots 314, 404, 814 that are unused by other HMB data and are adjacent with respect to each other in the HMB read buffer 316, 402, 502, 602, 702 at the time of the HMB read request.

In one example, the controller may receive multiple commands at block 904 (e.g., a first command indicating a first host data length and a second command indicating a second host data length). In such case, the portion of the L2P address translation data indicated in the request transmitted at block 906 may be for the first command and the second command, and a size of the L2P address translation data associated with the request (the HMB transfer size) may be based on the first host data length and the second host data length. For instance, referring to FIG. 8, controller 802 may receive multiple of commands 810 from the host 806, such as a first read command including LBA Z and a given host data length (e.g., 256 kB) and a second read command including LBA W and an associated host data length (e.g., 256 kB). If the commands are sequential, then controller 123, 302, 802 may transmit HMB read request 312, 812 to host 104, 306, 806 for the portion 813 of the L2P address translation data 808 associated with the combination of commands 810 received from the host. For instance, to obtain portion 813 of L2P address translation data 808 from the HMB 105, 304, 804, the controller may dynamically determine the HMB transfer size associated with a single HMB read request from the host data lengths (e.g., lengths 212) associated with the logical addresses 208 indicated in the plurality of commands 810 as well as the quantity of memory slots 314, 404, 814 that are unused by other HMB data and are adjacent with respect to each other in the HMB read buffer 316, 402, 502, 602, 702 at the time of the HMB read request.

In one example, as represented by block 908, the controller may search, in the volatile memory, for multiple contiguous memory locations to store the portion of the L2P address translation data. If the controller successfully locates the multiple contiguous memory locations during the search, then as represented by block 910, the controller may transmit the request in response to locating the multiple contiguous memory locations. Afterwards, as represented by block 912, the controller may receive the portion of the L2P address translation data in response to the request, and as represented by block 914, the controller may store, in the multiple contiguous memory locations, the portion of the L2P address translation data. For instance, referring to FIG. 8, the controller 802 may search for four 128-byte slots of the memory slots 814 within HMB read buffer 816 which are free and contiguous to accommodate the two combined 256 kB host commands (effectively, a 512 kB sequential command), and upon successfully locating four free and contiguous slots 4-7, the controller 802 may transmit one HMB read request including an HMB transfer size of 512 bytes to obtain the portion 813 of the associated L2P address translation data. In response to the HMB read request 812, the host 806 may transmit portion 813 to the controller 802, which may control the HMB read/write driver to load the portion 813 of L2P address translation data 808 into memory slots 4-7.

Otherwise, if the controller failed to locate the multiple contiguous memory locations during the search, then as represented by block 916, the controller may transmit multiple requests for the portion of the L2P address translation data. Afterwards, as represented by block 918, the controller may receive the portions of the L2P address translation data respectively in response to the multiple requests, and as represented by block 920, the controller may store, in non-contiguous memory locations, the portion of the L2P address translation data. For instance, referring to FIG. 8, as previously described, the controller 802 may search for four 128-byte slots of the memory slots 814 within HMB read buffer 816 which are free and contiguous to accommodate the two combined 256 kB host commands (effectively, a 512 kB sequential command). If the search is unsuccessful (e.g., the controller fails to locate the four free and contiguous slots 4-7, such as locating only three contiguous and free slots 4-6 in this example), then the controller may send one HMB read request for 384 bytes of HMB data (part of portion 813) to be stored in memory slots 4-6 (e.g., 256 bytes covering 256 kB of address translation data in the first two slots and 128 bytes covering 128 kB of address translation data in the third slot), and another HMB read request for the remaining 128 bytes of HMB data (a remainder of portion 813) to be stored in another slot that is non-contiguous with respect to memory slots 4-6 (e.g., 128 bytes covering 128 kB of address translation data in the fourth slot). For instance, this fourth slot may be memory slot 2, memory slot 8, or other non-contiguous slot to memory slots 4-6 (i.e., a slot other than memory slot 3 or 7). In response to the first HMB read request for 384 bytes of HMB data (part of portion 813), the host 806 may transmit this part of portion 813 to the controller 802, which may control the HMB read/write driver to load the part of portion 813 of L2P address translation data 808 into the three contiguous and free memory slots. In response to the second HMB read request for the 128 bytes of HMB data (the remainder of portion 813), the host 806 may transmit this remainder of portion 813 to the controller 802, which may control the HMB read/write driver to load the remainder of portion 813 of L2P address translation data 808 into the non-contiguous memory slot.

Finally, as represented by block 922, after storing the portion of the L2P address translation data at block 914 or 920, the controller may free the memory location(s) after the portion(s) of the L2P address translation data are passed to a physical sequencer for command execution. For instance, referring to FIG. 8, after the host 806 transmits portion 813 to the controller 802 (in one portion or in parts), which may control the HMB read/write driver to load the portion 813 of L2P address translation data 808 into memory slots 4-7 (or memory slots 4-6 and a non-contiguous memory slot), the controller may execute the associated command. For instance, during execution of the command, the controller 802 may fetch the portion 813 of L2P address translation data 808 from the HMB read buffer 816 to identify the physical address associated with that command, and pass that physical address to a physical sequencer to read the data at the identified physical address. Afterwards, the controller may free memory slots 4-7 for later use.

Figure 10:
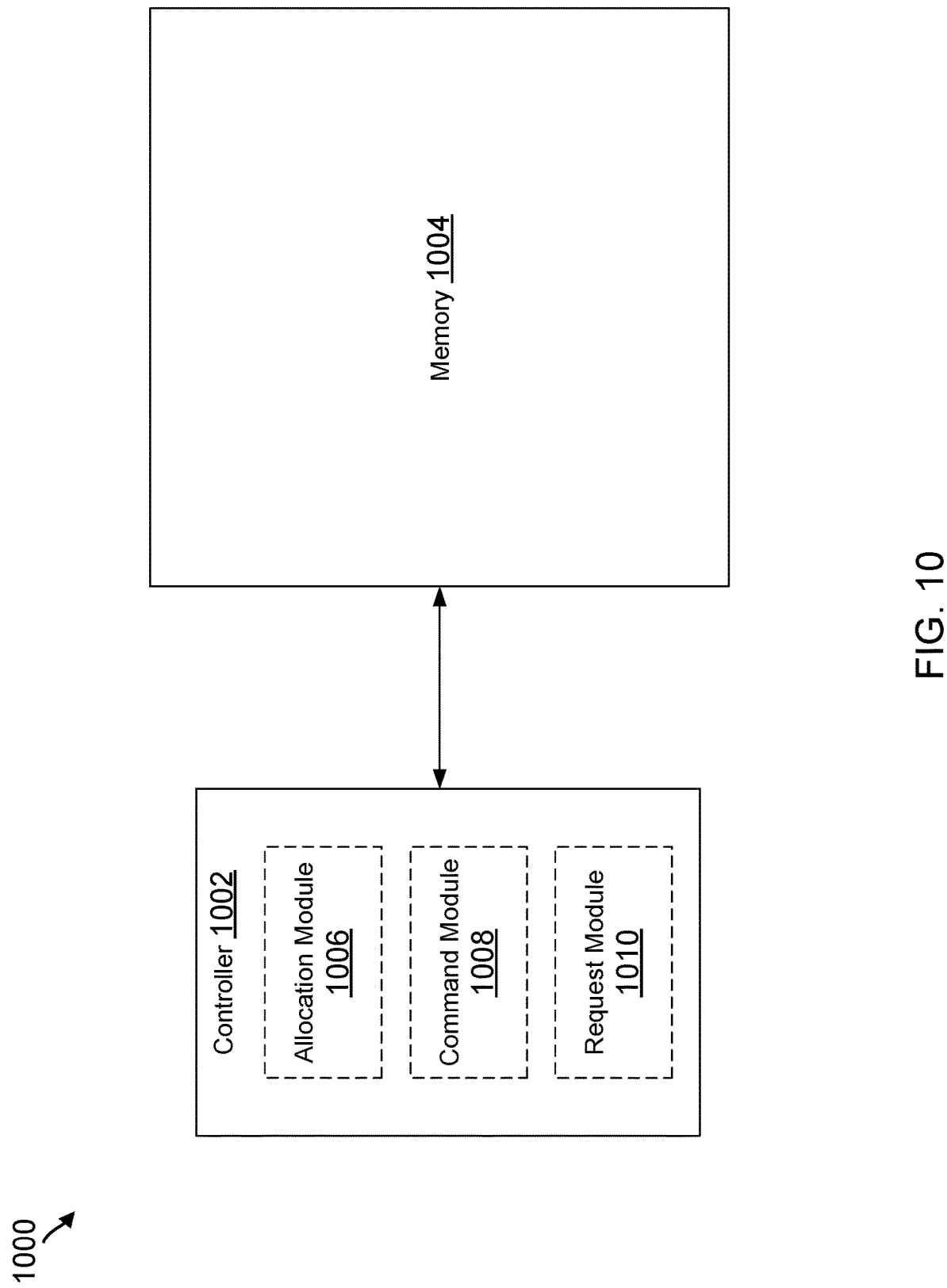
FIG. 10 is a conceptual diagram illustrating an example of a controller that requests L2P address translation data from an HMB using a dynamically determined HMB transfer size in the storage device of FIG. 1.

FIG. 10 is a conceptual diagram illustrating an example 1000 of a controller 1002 coupled to a memory 1004 in a storage device. For example, controller 1002 may correspond to controller 123, 302, 802 and memory 1004 may correspond to the NVM 110, 201 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 1002 includes an allocation module 1006 that may provide a means for allocating, in the volatile memory, a plurality of memory locations for L2P address translation data from an HMB. For example, the allocation module 1006 may perform the process described above with respect to block 902 of FIG. 9. For instance, the allocation module 1006 may allot memory slots 314, 404, 814 respectively of fixed size 406 (e.g., L bytes) within HMB read buffer 316, 402, 502, 602, 702 in volatile memory 118 for storing L2P address translation data 808 (e.g., entries 206 of L2P mapping table 120, 205 in one or more Msets 203, 308) obtained from HMB 105, 304, 804.

In one example, the controller 1002 includes a command module 1008 that may provide a means for receiving a command indicating a host data length. For example, the command module 1008 may perform the process described above with respect to block 904 of FIG. 9. For instance, the command module 1008 may receive command 310, 504, 506, 604, 704, 810 (e.g., a host read command or a host write command) indicating a plurality of logical addresses (e.g., logical address 208, such as LBA X, Y, V, U, or Z) and associated host data lengths (e.g., lengths 212). Moreover, the command module 1008 may receive multiple of such commands 810 including respective host data lengths, such as a first read command including LBA Z and a second read command including LBA W as illustrated in the example of FIG. 8.

In one example, the controller 1002 includes a request module 1010 that may provide a means for transmitting a request for a portion of the L2P address translation data stored in the HMB, the portion of the L2P address translation data being for the command. For example, the request module 1010 may perform the process described above with respect to block 906 of FIG. 9. For instance, request module 1010 may transmit HMB read request 312, 812 to host 104, 306, 806 for the portion 813 of the L2P address translation data 808 associated with the command 310, 504, 506, 604, 704, 810 received from the host.

Accordingly, the controller of the storage device described throughout the present disclosure may request L2P address translation data from an HMB for execution of an associated host command using a dynamically determined HMB transfer size. Thus, read latencies may be reduced leading to higher performance, and controller efficiency (e.g., CPU cycle efficiency) may be increased. For instance, the controller may apply a dynamic HMB transfer size for a single HMB read request based on the host data length of the associated host command and/or based on a quantity of contiguous memory locations available in the HMB read buffer, rather than apply a static HMB transfer size based on the size of the memory slot in the HMB read buffer as previously described. As a result, the controller may obtain the entire L2P address translation data for the host command in response to a single HMB read request, allowing reduced latency in obtaining the L2P address translation associated with the command to thereby be achieved. Moreover, even if the controller undergoes a search cycle penalty for cases where fewer, free contiguous memory slots are available in the HMB read buffer, performance may still be improved overall since the controller may obtain the entire L2P address translation data for the host command in response to fewer HMB read requests using the dynamic HMB transfer size approach than using the aforementioned static HMB transfer size.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a volatile memory; and
a controller configured to:
  allocate, in the volatile memory, a plurality of memory locations for logical-to-physical (L2P) address translation data from a host memory buffer (HMB);
  receive a command indicating a host data length;
  transmit a request for a portion of the L2P address translation data stored in the HMB, the portion of the L2P address translation data being for the command, and a size of the L2P address translation data associated with the request being based on the host data length indicated in the command;
  receive the portion of the L2P address translation data in response to the request;
  store, in one of the memory locations, the portion of the L2P address translation data; and
  free the one of the memory locations after the portion of the L2P address translation data is passed to a physical sequencer for execution of the command.

2. The storage device of claim 1,
wherein the size of the L2P address translation data associated with the request is further based on a quantity of the memory locations which are free and contiguous at a time of the request.

3. The storage device of claim 2, wherein the controller is further configured to:
search, in the volatile memory, for multiple contiguous ones of the memory locations to store the portion of the L2P address translation data; and
transmit the request in response to locating the multiple contiguous ones of the memory locations.

4. The storage device of claim 3, wherein the controller is further configured to:
receive the portion of the L2P address translation data in response to the request; and
store, in the multiple contiguous ones of the memory locations, the portion of the L2P address translation data.

5. The storage device of claim 2, wherein the controller is further configured to:
search, in the volatile memory, for multiple contiguous ones of the memory locations to store the portion of the L2P address translation data; and in response to failing to locate the multiple contiguous ones of the memory locations, transmit another request for another portion of the L2P address translation data.

6. The storage device of claim 5, wherein the controller is further configured to:
   receive the portion of the L2P address translation data in response to the request; and
   receive the another portion of the L2P address translation data in response to the another request.

7. The storage device of claim 2, wherein the size of the L2P address translation data associated with the request is further based on a minimum of:
   a size of the portion of the L2P address translation data for the command, and
   a total size of the quantity of the memory locations which are free and contiguous at the time of the request.

8. The storage device of claim 1, wherein the controller is further configured to receive a second command indicating a second host data length, the portion of the L2P address translation data indicated in the request is for the command and the second command, and the size of the L2P address translation data associated with the request is further based on the second host data length.

9. A storage device, comprising:
   a volatile memory; and
   a controller configured to:
      allocate, in the volatile memory, a plurality of memory locations for storing logical-to-physical (L2P) address translation data from a host memory buffer (HMB); and
      transmit a request for a portion of the L2P address translation data stored in the HMB, the portion of the L2P address translation data being for a host command, and a size of the L2P address translation data associated with the request being based on a quantity of the memory locations which are free and contiguous at a time of the request.

10. The storage device of claim 9,
    wherein the host command indicates a host data length, and the size of the L2P address translation data associated with the request is further based on the host data length indicated in the host command.

11. The storage device of claim 9, wherein the controller is further configured to:
    search, in the volatile memory, for multiple contiguous ones of the memory locations to store the portion of the L2P address translation data;
    transmit the request in response to locating the multiple contiguous ones of the memory locations; and
    receive the portion of the L2P address translation data in response to the request.

12. The storage device of claim 9, wherein the controller is further configured to:
    search, in the volatile memory, for multiple contiguous ones of the memory locations to store the portion of the L2P address translation data; and
    in response to failing to locate the multiple contiguous ones of the memory locations:
       transmit another request for another portion of the L2P address translation data; and
       receive the another portion of the L2P address translation data in response to the another request.

13. The storage device of claim 9, wherein the host command indicates a host data length, and a size of the L2P address translation data associated with the request is further based on a minimum of:
    a size of the portion of the L2P address translation data for the host command, and
    a total size of the quantity of the memory locations which are free and contiguous at the time of the request.

14. The storage device of claim 9, wherein the controller is further configured to receive a second host command indicating a second host data length, the portion of the L2P address translation data indicated in the request is for the host command and the second host command, and the size of the L2P address translation data associated with the request is further based on the second host data length.

15. A storage device, comprising:
    a volatile memory; and
    a controller configured to:
       allocate, in the volatile memory, a plurality of memory locations for storing logical-to-physical (L2P) address translation data from a host memory buffer (HMB);
       receive a command; and
       transmit a request for a portion of the L2P address translation data stored in the HMB, the portion of the L2P address translation data being for the command, and a size of the L2P address translation data associated with the request being based on a minimum of:
          a size of the portion of the L2P address translation data for the command, and
          a total size of a quantity of the memory locations which are free and contiguous at a time of the request.

16. The storage device of claim 15,
    wherein the volatile memory is internal to the controller.

17. The storage device of claim 15,
    wherein the volatile memory is external to the controller.

18. The storage device of claim 15, wherein the controller is configured to transmit the request based on the size of the portion of the L2P address translation data for the command being larger than a size of a respective one of the memory locations.

* * * * *